US012759893B2

(12) United States Patent
Pierau et al.

(10) Patent No.: US 12,759,893 B2
(45) Date of Patent: Oct. 13, 2026

(54) RECOVERY OF CHLORINE FROM HYDROGEN CHLORIDE GENERATED IN CARBOCHLORINATION PROCESSES

(71) Applicant: Kronos International, Inc., Leverkusen (DE)

(72) Inventors: Thomas Pierau, Leverkusen (DE); Mitja Medved, Leverkusen (DE)

(73) Assignee: Kronos International, Inc., Leverkusen (DE)

( * ) Notice: Subject to any disclaimer, the term of this patent is extended or adjusted under 35 U.S.C. 154(b) by 565 days.

(21) Appl. No.: 18/225,848

(22) Filed: Jul. 25, 2023

(65) Prior Publication Data

US 2024/0034638 A1 Feb. 1, 2024

(51) Int. Cl.

*C01G 23/053* (2006.01)
*C01B 7/04* (2006.01)
*C01G 49/02* (2006.01)
*C25B 1/26* (2006.01)

(52) U.S. Cl.

CPC ............ *C01G 23/0536* (2013.01); *C01B 7/04* (2013.01); *C01G 49/02* (2013.01); *C25B 1/26* (2013.01)

(58) Field of Classification Search

CPC .... C01G 23/0536; C01G 49/02; C01G 49/06; C01G 49/10; C01B 7/04; C25B 1/26; C22B 34/1209

See application file for complete search history.

(56) References Cited

U.S. PATENT DOCUMENTS

| | | | | |
|---|---|---|---|---|
| 3,925,057 | A | 12/1975 | Fukushima et al. | |
| 2010/0257978 | A1 | 10/2010 | Bergeron et al. | |
| 2015/0027902 | A1 | 1/2015 | Gharda | |
| 2016/0137498 | A1* | 5/2016 | Gnotke | C23G 1/36 423/488 |
| 2018/0105435 | A1* | 4/2018 | Medved | C22B 7/001 |

OTHER PUBLICATIONS

Lakshmanan V I et al: "Development of Mixed-Chloride Hydrometallurgical Processes for the Recovery of Value Metals from Various Resources", Fundamentals of Petroleum and Petrochemical Engineering, vol. 69, No. 1, Dec. 12, 2015, pp. 39-50, XP035964078, DOI: 10.1007/S12666-015-0626-5 [retrieved on Dec. 12, 2015].

PCT International Search Report and Written Opinion, mailed on Apr. 11, 2023, issued during the prosecution of corresponding PCT International Patent Application No. PCT/EP2022/070997; 10 pages.

* cited by examiner

*Primary Examiner* — Anthony J Zimmer
*Assistant Examiner* — Syed T Iqbal
(74) *Attorney, Agent, or Firm* — Troutman Pepper Locke LLP; Mark R. Backofen

(57) ABSTRACT

The invention relates to a method for recovering chlorine from hydrogen chloride generated in carbochlorination processes. Further, the invention refers to the use of this method for recovering chlorine from hydrogen chloride generated in a carbochlorination process.

19 Claims, No Drawings

RECOVERY OF CHLORINE FROM HYDROGEN CHLORIDE GENERATED IN CARBOCHLORINATION PROCESSES

RELATED APPLICATION

This application claims the benefit of Patent Cooperation Treaty Application No. PCT/EP2022/070997 filed Jul. 26, 2022.

BACKGROUND

Field of the Invention

The invention relates to a method for recovering chlorine from hydrogen chloride generated in carbochlorination processes. Further, the invention refers to the use of this method for recovering chlorine from hydrogen chloride generated in a carbochlorination process.

Technological Background of the Invention

Carbochlorination processes are those in which metal oxides are converted into their corresponding metal chlorides in the presence of chlorine gas and carbonaceous materials. The most common carbochlorination processes involve the processing of feedstocks such as ores and slags containing the oxides of refractory metals, among them, niobium, tantalum, tungsten, molybdenum and rhenium or oxides of rare earth metals like cerium, neodymium, samarium or of oxides of light metals such as aluminum, silicon, vanadium or titanium or other metals like zirconium. Metal chlorides often show relatively low vapor pressure and can be removed from the original solid matrices by sublimation or can be purified by fractional sublimation or distillation thereby exploiting their varying boiling points, with or without the use of solvents. In addition, metal chlorides can also be purified by extraction or other separation methods.

Usually, metal chlorides are further processed to metals, metal alloys or purified oxides or hydroxides all of which are economically attractive. The carbochlorination process and the challenges connected to the use of chlorine in these processes will be further discussed using the example titanium dioxide in more detail.

Titanium dioxide is either manufactured by the well-established sulfate process or the chloride process. The latter uses a titanium-containing feedstock which is subjected to a carbochlorination process. The thus obtained chlorides are subsequently separated by resublimation or distillation. The titanium tetrachloride is finally converted to titanium dioxide, and the chlorine which is set free from the aforementioned reaction is separated, and reused in the reaction with the titanium-containing feedstock. Amongst other reasons, the reuse of chlorine makes the chloride process economically attractive over the sulphate process.

In case the titanium-containing feedstock contains a significant amount of components other than titanium, in particular iron, it is very burdensome to reuse the chlorine for the reaction with the titanium-containing feedstock. Because chlorides other than titanium tetrachloride are separated and removed from the process the chlorine from these components cannot be easily recovered, and it therefore is lost for the internal recycling rendering the method economically less attractive.

In order to compensate chlorine loses, new chlorine must be added to the system which is associated with increased costs. The higher the content of components other than titanium the higher must be the compensation for the losses. Therefore, feedstocks with a high titanium dioxide content of at least about 90 wt. % and a low content of further elements, which can be transformed into their chlorides, particularly iron, and result in byproducts of rather low commercial interest, are substantially preferred. These beneficial criteria are met by titanium containing slags and natural rutile. Disadvantageously, the production of titanium containing slags requires high energy input and natural rutile resources are becoming increasingly limited worldwide. The demand for natural rutiles is also increasing continuously due to the attractiveness of the chloride process. The increasing demand leads to a higher prices for these rutiles. Further, titanium sources such as ilmenite are available in higher amounts, but possess a significant amount of iron which would make the chloride process significantly more expensive for the reasons given above.

The patent application EP 21172411.7 employs titanium-bearing feedstock which comprises iron is also confronted with the above challenges. The feedstock is contacted with chlorine in a carbochlorination reactor, and the metals contained in the feedstock are reacted with chlorine. After the separation of the so-obtained ferrous chloride from the titanium tetrachloride, sulfuric acid is reacted with the ferrous chloride in order to obtain hydrogen chloride and iron sulfate via an exchange of anions. The hydrogen chloride is then converted to chlorine, e.g., by the Deacon process, and can be reintroduced into the carbochlorination reactor. The iron sulfate, however, is contaminated with heavy metals and other impurities, such as coke, ore residues and the like originating from the carbochlorination reactor. The contaminated monohydrate is of low commercial value and may be required to be disposed or, alternatively, purified which entails further costs which is of course undesired.

Summarizing the above, depending on the composition of the slags or ores employed as feedstock, using the carbochlorination processes to isolate a metal from ores or slags can possibly result in a profound loss of chlorine due to the presence of further metals, in particular of iron, in the slags or ores employed. This renders the overall carbochlorination process cost-intensive, less sustainable and hence less attractive.

Therefore, there is a need in the art for a method for recovering chlorine from hydrogen chloride in carbochlorination processes in which metal-bearing feedstocks with iron are employed which are economically attractive with substantially less byproducts with low commercial value.

SUMMARY OF THE INVENTION

It is the object of the invention to provide an improved method for recovering chlorine from hydrogen chloride in carbochlorination processes which is economically attractive with substantially less byproducts with low commercial value.

This object is achieved by the method and the use of the present invention.

The invention provides a method for recovering chlorine from hydrogen chloride generated in a carbochlorination process wherein the metal-bearing feedstock comprises iron. The obtained metal chlorides can preferably be isolated and further processed to the desired end-product, for example, to the respective metals, metal alloys or purified oxides or hydroxides. The preferred embodiment of the method advantageously allows to recover chlorine from iron chlorides, i.e., ferrous chloride and/or ferric chloride, by isolating the iron chlorides followed by subjecting the iron chlorides to a hydrolysis step to obtain iron oxide and hydrogen chloride. The latter can preferably be subsequently converted into chlorine, for example, by using the Deacon process, and can be reused in the carbochlorination reaction. As a result, natural ores with a high metal content and expensive, manufactured slags are not the only eligible source as feedstock in carbochlorination processes, which renders the method and the use according to the present invention economically beneficial.

Therefore, in a first aspect, the invention relates a method for recovering chlorine from hydrogen chloride generated in a carbochlorination process, the method comprises of the following steps:

a) contacting carbonaceous material and chlorine with a metal-bearing feedstock which comprises iron to obtain a chloride mixture comprising ferrous and/or ferric chloride and metal chlorides,
b) separating the ferrous and/or ferric chloride from the chloride mixture,
c) subjecting the ferrous and/or ferric chloride to a hydrolysis step to obtain hydrogen chloride,
d) converting at least a portion of the obtained hydrogen chloride into chlorine, and optionally
e) using at least a portion of the chlorine obtained in step d) in step a).

In as second aspect, the invention is directed to the use of the method disclosed herein for recovering chlorine from hydrogen chloride generated in a carbochlorination process.

Further advantageous embodiments of the invention are stated in the dependent claims.

DESCRIPTION OF THE PREFERRED EMBODIMENTS

These and other aspects, features and advantages of the invention become obvious to the skilled person from the study of the following detailed description and claims. Each feature from one aspect of the invention can be employed in any other aspect of the invention. Numerical ranges stated in the format "from x to y" include the mentioned values and the values that are within the respective measuring accuracy as known to the skilled person. If several preferred numerical ranges are stated in this format, it is a matter of course that all ranges formed by the combination of the various end points are also included. The use of the term "about" is intended to encompass all values that lie within the range of the respective measurement accuracy known to the skilled person.

In step a) of a preferred embodiment of the method according to the present invention, the carbonaceous material and chlorine is contacted with a metal-bearing feedstock which comprises iron to obtain a chloride mixture comprising iron chloride and metal chlorides. As used herein, "iron chloride" means ferrous chloride, ferric chloride or combinations thereof. Preferably, the metal-bearing feedstock comprises up to about 70 wt. %, preferably up to about wt. %, and more preferably up to about 50 wt. % iron based on the total weight of metal-bearing feedstock. In connection with the feature "metal-bearing feedstock which comprises iron", it is meant that the metal is any metal but iron. The metal is preferably selected from the group consisting of refractory metals, rare earth metals and light metals. More preferably, the metal is selected from the group consisting of niobium, tantalum, tungsten, molybdenum, rhenium, zirconium, cerium, neodymium, samarium, aluminum, silicon, vanadium or titanium, even more preferably titanium. The metal can be present in the feedstock as its respective element, as a salt and/or as an oxide, commonly as its respective oxide. The iron of the metal-bearing feedstock can also be present as its respective element, as a salt and/or as an oxide, commonly as a respective oxide, in the oxidation state (II) or (III). Any carbonaceous material can be employed which comprises sufficient carbon to generate a sufficient reduction potential and temperature necessary for the carbochlorination process. The material can be selected from the group consisting of petroleum coke, hydrothermally generated carbon, charcoals generated from different origins such as wood, seeds, and the like, carbon black and soot. Further metals and metalloids can be present in the feedstock. As a result of step a), a chloride mixture is obtained which comprises ferrous and/or ferric chloride and metal chlorides.

From the chloride mixture comprised of metal chlorides and the ferrous chloride and/or ferric chloride obtained in step a) the ferrous chloride and/or ferric chloride is separated in the subsequent step b) from the chloride mixture. This can be accomplished by common techniques such as resublimation or distillation, but also by extraction or any other separation process. Preferably, the ferrous chloride and/or ferric chloride is purified prior to step c) in order to remove impurities which comprises unreacted metal-bearing feedstock and unreacted carbonaceous material to which the aforementioned chlorides adhere.

In step c), the ferrous chloride and/or ferric chloride is subjected to a hydrolysis step to obtain hydrogen chloride. The ferrous chloride and/or ferric chloride are obtained in step b). Preferably, step c) is conducted in the presence of a mediation agent at elevated temperatures in the range of between about 120° C. to about 350° C., preferably between about 160° C. to about 260° C. and more preferably between about 180° C. and about 240° C. The mediation agent is a medium in which the hydrolysis is performed. It can be comprised of inert or reactive salt melts, ionic liquids, deep eutectic solvents, non-aqueous solvents, and with or without the addition of co-solvents. In one embodiment of the invention, salt melt consisting of zinc chloride has been found to be particularly favorable for conducting a hydrolysis reaction which can be conducted both in a slurry in case ferrous chloride is the dominant species in the metal chloride phase or in a homogenous melt in case ferric chloride is the dominant species in the metal chloride phase. Alternatively, the hydrolysis reaction may further be conducted without mediation agents if ferric chloride is present during step c). Certain initial amount of water may be added to the chosen mediation agents in order to enhance their viscosity which is favorable for the operation of the process. During the hydrolysis reaction the amount of water in the mediation agent is kept constant at the initial level, where the level is chosen in such a way that the vapor pressure of water above the mixture is always below the vapor pressure of hydrogen chloride. This enables the gaseous hydrogen chloride to be recovered from hydrolysis reaction almost water-free. "Water-free" hydrogen chloride, as used herein, refers to a water concentration in gaseous hydrogen chloride which does not exceed about 15 vol. % and can range as low as about 0.01 vol. % of the total weight of the hydrogen chloride and water. The hydrolysis reaction may be supported by introduction of oxygen or other oxidizing agents which is required when ferrous iron is the dominant iron chloride species. Usually, iron oxide in the form of hematite is obtained as byproduct.

In another preferred embodiment of the invention, the hydrolysis in step c) is conducted as pyrohydrolysis at a temperature of between about 600° C. to about 1200° C., preferably between about 700° C. to about 1000° C. and more preferably between about 800° C. and about 900° C. For this purpose a spray roasting device as it used in the so-called Ruthner process can be employed in which natural gas is oxidized in a reactor in the presence of oxygen. Alternatively, the Lurgi process in a fluidized bed can be performed in order to conduct the pyrohydrolysis.

In a preferred embodiment, the water generated during the hydrolysis or the pyrohydrolysis process is removed to the level required to conduct gas phase oxidation of hydrogen chloride over Deacon catalysts. Thus, in a preferred embodiment of the present invention, the water is removed from the hydrogen chloride prior to step d) such that the hydrogen chloride comprises water of up to about 25 vol. %, preferably up to about 15 vol. %, more preferably up to about 5 vol. % and even more preferably up to about 1 vol. % based on the total volume of the gaseous hydrogen chloride and the gaseous water. This is accomplished by common techniques and apparatuses to obtain gaseous hydrogen chloride.

Then, in step d), at least a portion of the obtained hydrogen chloride is converted into chlorine. The hydrogen chloride is obtained in step c). In a preferred embodiment of the invention, the conversion is conducted at an elevated temperature, typically in the range of from about 400° C. to about 450° C. in the presence of a catalyst, although specific catalysts may allow to significantly lower this temperature range. For example, the application EP 0980340.5 discloses a catalyst, preferably a supported ruthenium oxide catalyst, which allows to reduce the lower temperature of the temperature range down to about 100° C. As known by the skilled person, the oxidation of hydrogen chloride is an equilibrium reaction. If the reaction is performed at high temperatures, the equilibrium conversion decreases. It is hence preferable to perform the oxidation at low temperature of about 100° C. to about 300° C. The catalyst and the method disclosed in EP 0980340.5 are hereby incorporated by reference. Catalysts which also can be used in this step are either based on copper chloride, i.e. known mixtures of copper(I) chloride and copper(II) chloride, zinc chloride or on ferric chloride. Other catalysts comprise ruthenium oxide, cerium oxide or chromium(III) oxide supported on tin oxide, silicon dioxide, titanium dioxide, aluminum oxide or lanthanum oxide are also known. The oxidation of hydrochloric acid to chlorine based on a catalyst is also known as the so-called Deacon process. Process using the so-called fixed-bed reaction system wherein hydrogen chloride and oxygen are allowed to pass through a catalyst bed which is formed by packing a reaction tube with a catalyst for use in production of chlorine. In case where hydrogen chloride is oxidized on an industrial scale by a fixed-bed reaction system, a fixed-bed multi-tubular reactor is generally used. In this oxidation reaction, a large amount of a catalyst for use in production of chlorine is needed to form catalyst beds in all of these reaction tubes.

In another preferred embodiment, the hydrogen chloride generated in step c) is subject to an absorption step in water, generating an aqueous hydrochloric acid with a concentration of from about 28 to about 34 wt. % hydrogen chloride, prior to the conversion in step d), and that the conversion is conducted by means of an electrolysis. Electrolysis with implemented Oxygen Depolarized Cathodes (ODC) is particularly suitable, when the water content in the gaseous hydrogen chloride before absorption exceeds about 25 vol. % referred to the total weight of water and the gaseous hydrogen chloride. Both conversion techniques are well-established in the art.

The obtained chlorine can be employed as a valuable raw material in the production of vinyl chloride or phosgene. Optionally, in step e), at least a portion of the chlorine obtained can be used in step a) and thus recycled. Prior to the reusage of the chlorine in step a), water from the chlorine is removed to the level required for carbochlorination.

The method steps described herein are conducted in the following order: a), b), c), d) and then e).

In case the metal of the metal-bearing feedstock is titanium, the feedstock is preferably selected from ilmenites, perovskites, rutiles, titanites or a mixture thereof. Techniques and apparatuses commonly used in the chloride process such as reactors for conducting a carbochlorination reaction in which a fluidized bed can be employed in this step.

In a further aspect of the invention, the method disclosed herein is used for recovering chlorine from hydrogen chloride generated in a carbochlorination process. Preferably, the carbochlorination process is used in the chloride process to obtain titanium dioxide. The latter is in particular suitable as a white pigment in lacquer, paint and décor paper applications.

The above descriptions of certain embodiments are made for the purpose of illustration only and are not intended to be limiting in any manner Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

The invention claimed is:

1. A method for recovering chlorine from a carbochlorination process, the method comprising:

a) contacting carbonaceous material and chlorine with a metal-bearing feedstock comprising iron to obtain a chloride mixture comprising iron chloride and metal chlorides, b) separating the iron chloride from the chloride mixture, c) subjecting the iron chloride to a hydrolysis step to obtain hydrogen chloride, d) converting at least a portion of the obtained hydrogen chloride into chlorine, and optionally e) using at least a portion of the chlorine obtained in step d) in step a);

wherein the method is used in connection with a carbochlorination process.

2. The method of claim 1, wherein the hydrolysis of step c) is conducted in the presence of a mediation agent and at a temperature of between about 120° C. to about 350° C.

3. The method of claim 2, wherein the temperature is between about 160° C. to about 260° C.

4. The method of claim 3, wherein the temperature is between about 180° C. and about 240° C.

5. The method of claim 1, wherein the hydrolysis in step c) is pyrohydrolysis and is at a temperature of between about 600° C. and about 1200° C.

6. The method of claim 5, wherein the temperature is between about 700° C. and about 1000° C.

7. The method of claim 6, wherein the temperature is between about 800° C. and about 900° C.

8. The method of claim 1, wherein the hydrogen chloride obtained in step c) comprises water and further comprising the step of removing the water from the hydrogen chloride prior to step d) such that the hydrogen chloride comprises water of less than about 25 vol. % based on the total volume of the hydrogen chloride and the water.

9. The method of claim 8, wherein the water is removed such that the hydrogen chloride comprises water of less than about 15 vol. %.

10. The method of claim 9, wherein the water is removed such that the hydrogen chloride comprises water of less than about 5 vol. %.

11. The method of claim 10, wherein the water is removed such that the hydrogen chloride comprises water of less than about 1 vol. %.

12. The method of claim 1, wherein the metal is selected from the group consisting of refractory metals, rare earth metals, light metals, and mixtures thereof.

13. The method of claim 1, wherein the metal-bearing feedstock is a titanium-bearing feedstock comprising up to about 70 wt. % iron based on the total weight of titanium-bearing feedstock.

14. The method of claim 13, wherein the titanium-bearing feedstock comprises up to about 50 wt. % iron based on the total weight of titanium-bearing feedstock.

15. The method according to claim 13, wherein the titanium-bearing feedstock is selected from the group consisting of ilmenites, perovskites, rutiles, titanites and mixtures thereof.

16. The method of claim 1, wherein step d) is conducted at an elevated temperature in the presence of oxygen and a catalyst selected from the group consisting of ruthenium oxide, cerium oxide, chromium (III) oxide, copper chloride, ferric chloride, zinc chloride, and mixtures thereof.

17. The method of claim 16, wherein the catalyst is supported on tin oxide, silicon dioxide, titanium dioxide, aluminum oxide, lanthanum oxide or a mixture thereof.

18. The method of claim 1, further comprising:

subjecting the hydrogen chloride generated in step c) to an absorption step in water prior to the conversion in step d), and wherein the converting step d) is conducted by electrolysis.

19. The method of claim 1, wherein the carbochlorination process is part of the chloride process for producing titanium dioxide.

* * * * *